UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

COMPOSITION FOR PAVING PURPOSES.

942,236.     Specification of Letters Patent.     Patented Dec. 7, 1909.

No Drawing.     Application filed February 20, 1909. Serial No. 479,256.

*To all whom it may concern:*

Be it known that I, JOSEPH HAY AMIES, a citizen of the United States, residing at Philadelphia, in the county of Philadelphia and State of Pennsylvania, have invented a certain new and useful Composition for Paving Purposes, of which the following is a specification.

The principal object of my invention is to utilize a light oil in the production of a composition for paving purposes.

Another object is to make a composition without employing heat in preparing the mineral elements to receive the said light oil.

My process is as follows:—I place a batch quantity of mineral, or like elements as broken stones, pebbles, etc., upon a mixing board, or in a mixing machine in a cold state. I then coat these elements with a light oil, such as crude oil or the like. When this is effected I pour thereon and thereover a due quantity of boiling asphalt or other desirable elements and mix them well together. It will be found that the hot elements will now easily and rapidly adhere to the particles of the batch. I now pour over the batch thus mixed a due quantity of a rapid mixture of crushed calcium oxid or calcium hydrate and water constituting a cream of calcium hydrate. This cream of calcium hydrate should be thin enough to pour but it should be mixed with the batch before slaking has begun. After slaking, the calcium oxid becomes calcium hydrate. The result will be a friable and granular mass which can be used at convenience for the purposes for which it has been prepared.

What I claim is:—

A composition for paving purposes formed of mineral matters and the like, coated with a light oil then mixed with hot asphaltic cement and the like, then mixed with a cream of calcium hydrate, for the purposes as fully set forth.

In testimony whereof I hereunto sign my name.

JOSEPH HAY AMIES.

Witnesses:
   S. F. KOCH,
   WILLIAM J. JACKSON.